(12) United States Patent
Goto

(10) Patent No.: US 8,308,115 B2
(45) Date of Patent: Nov. 13, 2012

(54) IN-VEHICLE HOLDER SUPPORT DEVICE

(75) Inventor: Masayoshi Goto, Niiza (JP)

(73) Assignee: Honda Access Corp., Niiza-shi, Saitama (JP)

( * ) Notice: Subject to any disclaimer, the term of this patent is extended or adjusted under 35 U.S.C. 154(b) by 46 days.

(21) Appl. No.: 12/189,475

(22) Filed: Aug. 11, 2008

(65) Prior Publication Data
US 2009/0108149 A1 Apr. 30, 2009

(30) Foreign Application Priority Data

Oct. 30, 2007 (JP) ................................. 2007-281458

(51) Int. Cl.
*A47B 96/06* (2006.01)
(52) U.S. Cl. ............... 248/205.1; 248/309.1; 411/372.6; 24/453; 24/572.1
(58) Field of Classification Search .................... 16/2.4, 16/2.1; 411/433, 15, 44, 372.5, 372.6, 377, 411/431, 107, 156, 373; 24/40, 90.1, 572.1, 24/305, 453; 403/345; 280/801.1, 808, 728.2, 280/730.2; 297/468, 482; 248/220.21, 220.22, 248/682, 205.1, 309.1, 304
See application file for complete search history.

(56) References Cited

U.S. PATENT DOCUMENTS

| | | | | |
|---|---|---|---|---|
| 4,777,775 A * | 10/1988 | Verble | | 52/410 |
| 4,883,382 A * | 11/1989 | Mushya | | 411/182 |
| 4,964,594 A * | 10/1990 | Webb | | 244/131 |
| 5,421,067 A | 6/1995 | Akachi et al. | | |
| 5,833,416 A * | 11/1998 | Cau | | 411/55 |
| 5,909,902 A * | 6/1999 | Seabra | | 285/322 |
| 6,374,455 B1* | 4/2002 | Regele et al. | | 16/2.1 |
| 6,694,566 B1* | 2/2004 | Mockett | | 16/2.1 |
| 7,555,818 B2* | 7/2009 | Erskine et al. | | 24/305 |
| 2003/0007846 A1* | 1/2003 | Sbongk | | 411/433 |

(Continued)

FOREIGN PATENT DOCUMENTS

EP 0469713 A1 2/1992

(Continued)

OTHER PUBLICATIONS

United Kingdom Office Action dated Nov. 19, 2008, issued in corresponding United Kingdom Patent Application No. GB0814801.7.

(Continued)

*Primary Examiner* — Ramon Ramirez
*Assistant Examiner* — Todd M Epps
(74) *Attorney, Agent, or Firm* — Westerman, Hattori, Daniels & Adrian, LLP

(57) ABSTRACT

There is provided an in-vehicle holder support device to which an in-vehicle holder unit can be easily attached, with an improved rigidity thereof in an attached condition. In the in-vehicle holder support device, there is provided, in a base portion 12, a sloping surface 12c which slopes toward a side of a right seat frame cover 4 that is an object for attachment. An attaching portion 6 is allowed to slide via the sloping surface 12c and is guided to a gap G to be fitted thereinto. Besides, own weight of a pocket 2 can be certainly received by an opposed surface 14b that is formed flat in a holding portion 14. Thus, the pocket 2 can be easily attached to the in-vehicle holder support device and further rigidity of the in-vehicle holder support device 3 can be improved with the pocket 2 attached thereto.

12 Claims, 16 Drawing Sheets

U.S. PATENT DOCUMENTS

2004/0091332 A1 * 5/2004 Kuntze .................. 411/107

FOREIGN PATENT DOCUMENTS

| | | | |
|---|---|---|---|
| GB | 1060079 | A1 | 10/1962 |
| GB | 1087464 | A | 10/1967 |
| GB | 1451009 | A | 9/1976 |
| GB | 2323121 | A | 9/1998 |
| JP | 63-179880 | U | 11/1988 |
| JP | 10-291442 | A | 11/1998 |
| JP | 2001-258682 | A | 9/2001 |

OTHER PUBLICATIONS

Japanese Office Action dated Sep. 28, 2009 (mailing date), issued in corresponding Japanese Patent Application No. 2007-281458.

* cited by examiner

FIG.7(A)a

IN-VEHICLE HOLDER SUPPORT DEVICE

BACKGROUND OF THE INVENTION

1. Field of the Invention

The present invention relates to an in-vehicle holder support device, which is suitably utilized when an in-vehicle holder unit, selected from among various types thereof such as a pocket, a trash box, a table or the like, according to a usage as required, is attached to a desired position in a vehicle interior.

2. Description of Related Art

Japanese unexamined patent application publication No. 10-291442, for example, discloses a conventional article holder, which is utilized when various types of in-vehicle holder units such as a pocket, a trash box, a table, etc. are to be separately provided within a vehicle interior. The article holder comprises a hook, a base member formed according to a shape of an arm rest, and an article holding portion capable of holding various types of articles such as a beverage container or the like.

When the article holder is utilized, the base member is mounted on the arm rest and then the article holding portion for holding the in-vehicle holder units such as the pocket, the table or the like selected according to a usage as required can be attached to the hook of the base portion.

Since the article holder with the structure like this is utilized within a restricted vehicle interior, it is desirable that a user can easily attach the in-vehicle holder unit to the base member even in such a restricted in-vehicle space. At the same time, it is also desirable that in the article holder, the article holding portion is attached to the base portion so as to be able to withstand vibrations generated while the vehicle is travelling.

SUMMARY OF THE INVENTION

The present invention has been achieved with the view of the problems described above and therefore it is an object of the present invention to provide an in-vehicle holder support device which enables an easy attachment of an in-vehicle holder unit as well as the improvement of rigidity under an attached condition.

In order to solve these problems in the present invention, a first aspect of the present invention is an in-vehicle holder support device for detachably supporting an in-vehicle holder unit at an arbitrary attaching position within a vehicle interior, including: a substantially circular base portion arranged at the attaching position and a holding portion arranged coaxially with the base portion at a given distant position from the base portion via a connecting portion of a smaller diameter than that of the base portion and having substantially the same circular shape and substantially the same size as the base portion. Further, in a peripheral edge of an opposed surface to the holding portion, the base portion is formed with a sloping surface which slopes toward a side of an object for attachment. Then, another opposed surface of the holding portion to the base portion is formed flat, and thus an attaching portion of the in-vehicle holder unit is attached to a gap between the base portion and the holding portion.

Further, a second aspect of the present invention is the in-vehicle holder support device of the first aspect, in which a receiving portion for enabling the connecting portion to subside therein is provided in the base portion and/or the holding portion.

Furthermore, a third aspect of the present invention is the in-vehicle holder support device of the foregoing aspects, in which the holding portion is provided with a detachable member capable of being threadably attached.

According to the first aspect of the present invention, the attaching portion is allowed to slide via the sloping surface of the base portion which slopes toward the object for attachment and thus the attaching portion is guided into the gap to be permitted be attached thereto and further own weight of the in-vehicle holder unit can be certainly received by the opposed surface of the holding portion formed flat. Hence, the in-vehicle holder unit can be easily attached and the rigidity thereof in this attached condition can be improved.

Further, according to the second aspect of the present invention, the gap between the holding portion and the base portion is adjusted to allow the in-vehicle holder support device to be lower-profiled in no use.

Furthermore, according to the third aspect of the present invention, a type of the detachable member can be replaced according to a usage as required by a user and besides by being threadably attached to the holding member, the detachable member can be firmly attached to the holding portion.

BRIEF DESCRIPTION OF THE DRAWINGS

The invention will be more readily understood by reference to the following description, taken with the accompanying drawings, in which.

DETAILED DESCRIPTION OF THE INVENTION

Hereunder is a description of preferred embodiments of the present invention with reference to the accompanying drawings.
(First Embodiment)

Figure 1:
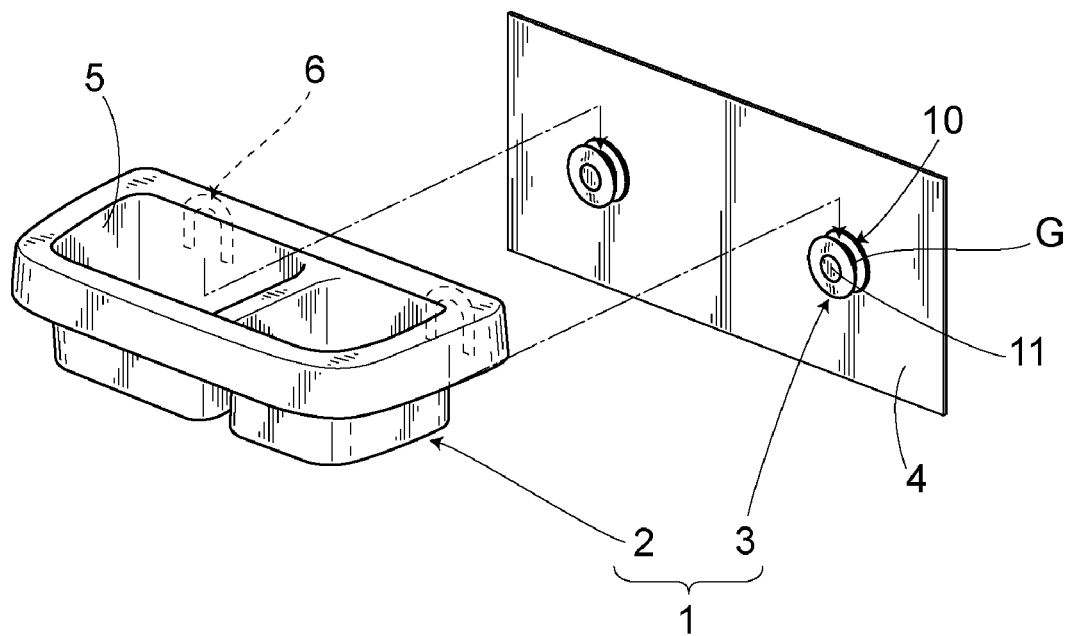
FIG. 1 is a perspective view of an overall structure of a detachable in-vehicle holder unit.

In FIG. 1, numeral symbol 1 denotes a detachable in-vehicle holder unit, which comprises a pocket 2 acting as an in-vehicle holder unit and an in-vehicle holder support device 3 which freely detachably supports the pocket 2. The in-vehicle holder support device 3 can be fixed to, e.g., a right seat frame cover 4 a user has desired to be an attaching position of the pocket 2.

Here, the pocket 2 is formed from a synthesized resin and has a housing portion 5 of a given form with a cross-sectional concave portion. A rear side of the housing portion 5 is formed in a vertically planate shape. The pocket 2 is equipped with two hanging portions 6 on a rear side of the housing portion 5 at a given interval.

Figure 2:
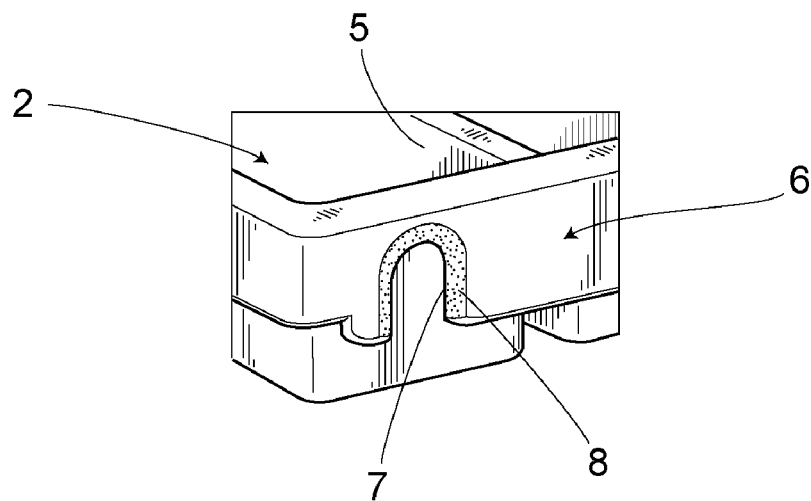
FIG. 2 is a perspective view illustrating a structure of an attaching portion provided on a rear face of a pocket.

As shown in FIG. 2, the attaching portion 6 includes an insertion portion 7 made by cutting off part of the attaching portion in an inverted-U shape and an inverted-U shaped fitting portion 8 formed thin along a peripheral edge of the insertion portion 7. Accordingly, as shown in FIG. 1, the insertion portion 7 and the fitting portion 8 are formed so as to be capable of being fitted into the gap G of the in-vehicle holder support device 3.

Figure 3A:
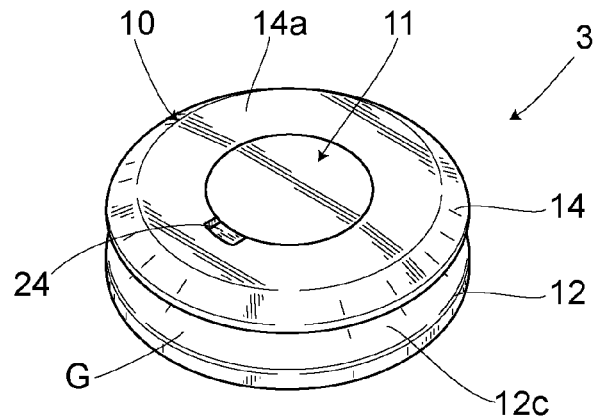
FIGS. 3(A) to 3(C) are schematic views illustrating an overall structure, a front structure and a transverse cross-sectional structure of an in-vehicle holder support device according to a first embodiment of the invention.
Figure 3B:
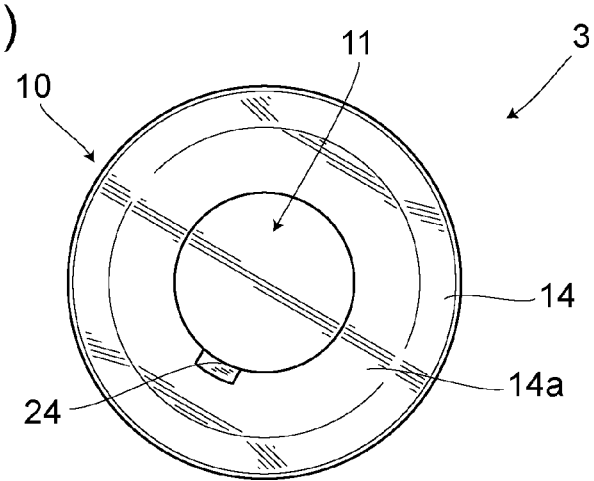
Figure 3C:
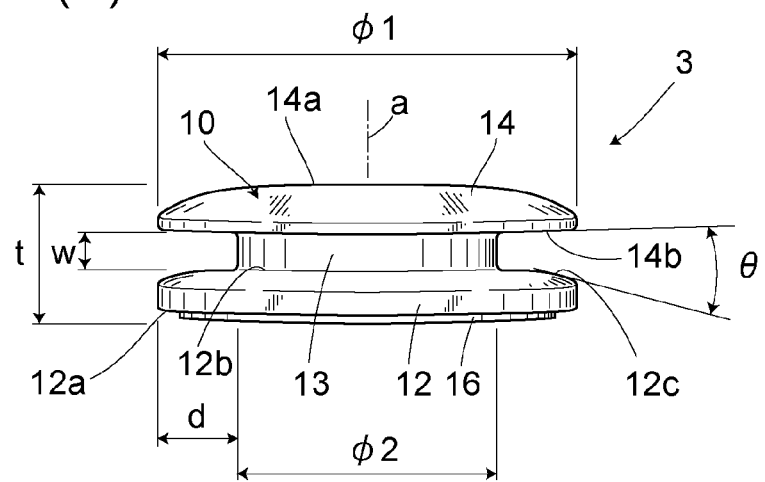

In practice, the in-vehicle holder support device 3 which supports the pocket 2 comprises, as shown in FIGS. 3(A), 3(B) and 3(C), a support main body 10 formed integrally from a synthesized resin material and a cap 11 likewise formed integrally from a synthesized resin material. Then, the cap 11 is detachably fitted into an external surface of the support main body 10.

Here, the support main body 10 comprises a discoid base portion 12 of a given thickness, a connecting portion 13 which is formed integrally with the base portion 12 and has a smaller diameter than that of the base portion 12 and a discoid holding portion 14 which is formed integrally with the connecting portion 13 and has the same shape and the same size as those of the base portion 12. Then, the base portion 12, the connecting portion 13 and the holding portion 14 are arranged coaxially with one another. The connecting portion 13 with a small diameter is arranged between the base portion 12 and the holding portion 14 at a lateral side of the support main body 10 and thus the annular gap G is formed around an entire circumference of the connecting portion 13.

Specifically, in the case of the present embodiment, the support main body 10 has, as shown in FIG. 3(C), a structure in which each dimension is selected so that the base portion 12 and the holding portion 14 are about 30 mm in diameter $\psi$ 1, the connecting portion is about 18 mm in diameter $\psi$ 2, and thickness t from a fixing surface 12a of the base portion 12 to an top surface 14a of the holding portion 14 is about 8 mm and further a width of the gap G into which the attaching portion 6 of the pocket 2 is fitted and is formed between the base portion 12 and the holding portion 14 is about 3 mm and furthermore a depth d of the gap G is about 6 mm. In this manner, reductions in size and profile are realized in the support main body 10.

In the holding portion 14, the peripheral edge of the external surface 14a is formed in such a manner as to smoothly slope toward a side (i.e., a side of the base portion 12) of an object for attachment and besides the base portion 12 and the opposed surface 14b to the base portion 12 are formed in a substantially planate shape. Further, the holding portion 14 is arranged substantially perpendicularly to an axial direction a of the support main body 10.

The base portion 12 is provided with an adhesive tape 16 for temporarily fixing the base portion 12a to an object for attachment and the adhesive tape 16 is allowed to be arranged in a substantially planate manner. In addition to the structure like this, on the opposed surface 12b to the holding portion 14, the base portion 12 is formed with a sloping surface 12c which slopes smoothly.

In the sloping surface 12c, a sloping angle θ is provided in relation to the opposed surface 14b of the holding portion 14 so as to lower gradually the sloping surface as coming closer from the connecting portion 13 to the peripheral edge to thus form the width w of the gap G at a side of an opening side more widely than that at a side of the connection portion 13.

Figure 4:
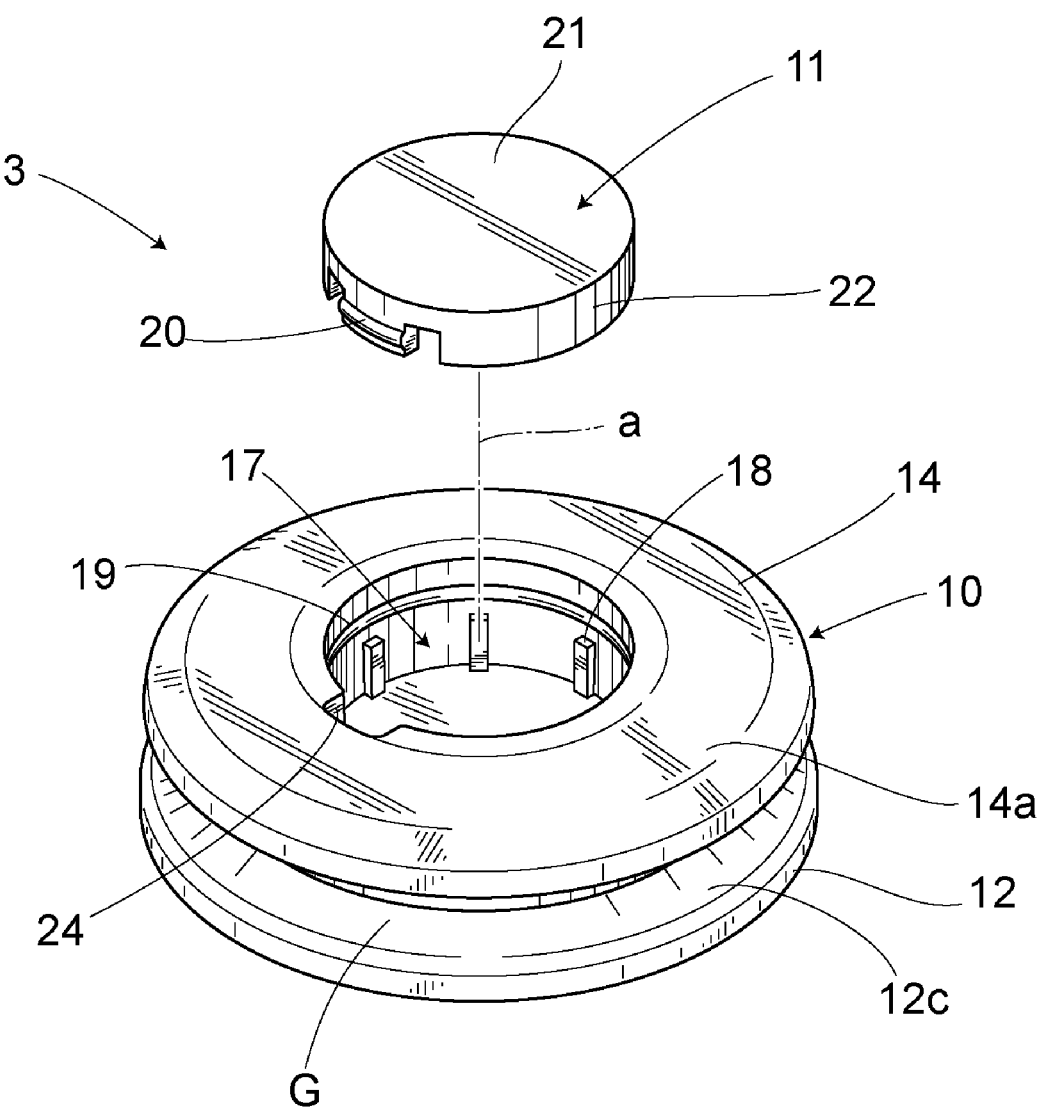
FIG. 4 is an exploded view of the in-vehicle holder support device that is disassembled into a support main body and a cap.

As shown in FIG. 4, an external surface 14a of the holding portion 14 is formed with a columnar depression 17 coaxially with the holding portion 14 and so the cap 11 can be fitted into the depression 17. In the depression 17, a plurality of belt-like projections 18 is formed in an inner circumferential surface of the depression 17 at given intervals along an axial direction a. The cap is allowed to abut against leading edges of the projections 18 to be capable of sitting at a give height.

Figure 5:
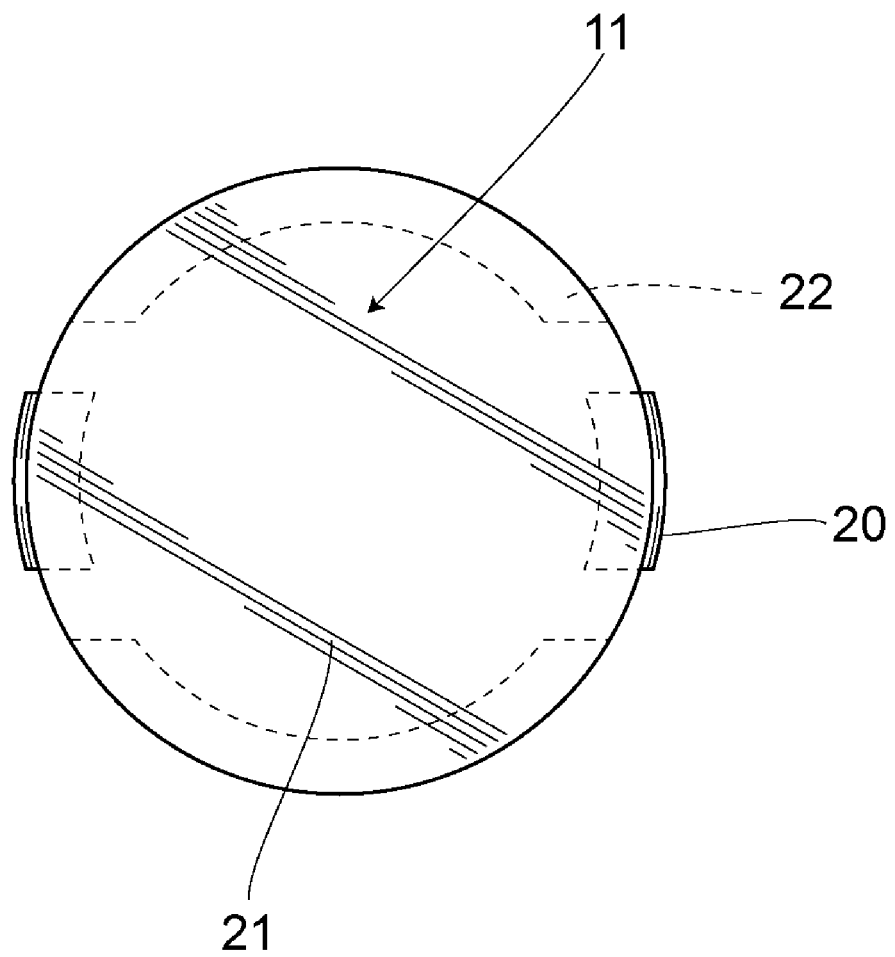
FIG. 5 is a schematic view illustrating the cap.

Further, on an inner circumferential surface of the depression 17, a groove 19 is circumferentially provided on superior portions of the leading edges of the projections 18. The groove 19 is formed so that a protrusion 20 provided in the cap 11 can be fitted thereinto, thus permitting the cap 11 to be prevented from disengaging from the depression 17. In addition, as shown in FIG. 5, the cap 11 is equipped with a disk-like top portion 21 formed in conformity with an opening shape of the depression 17 and a wall 22 falling from a peripheral edge of the top portion 21 and further the projection 20 is formed at a given position of the wall 22.

Figure 6A:
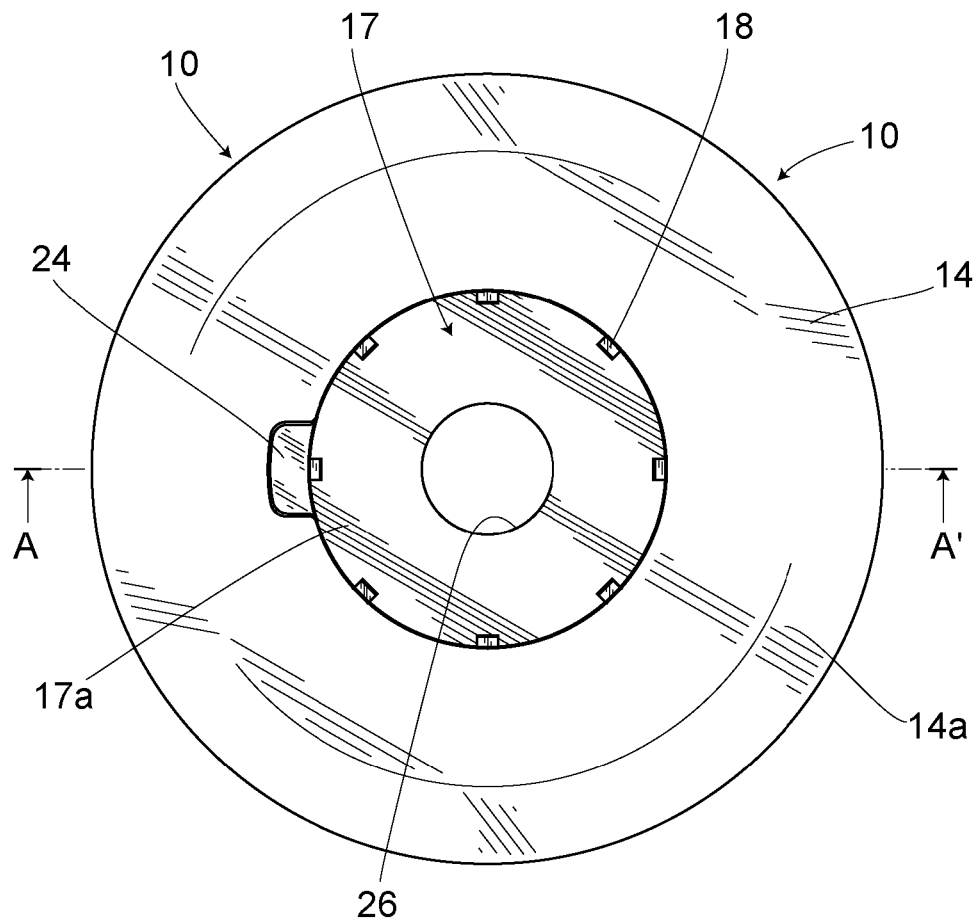
FIGS. 6(A) and 6(B) are schematic views illustrating a front structure and a transverse cross-sectional structure of the support main body, respectively.
Figure 6B:
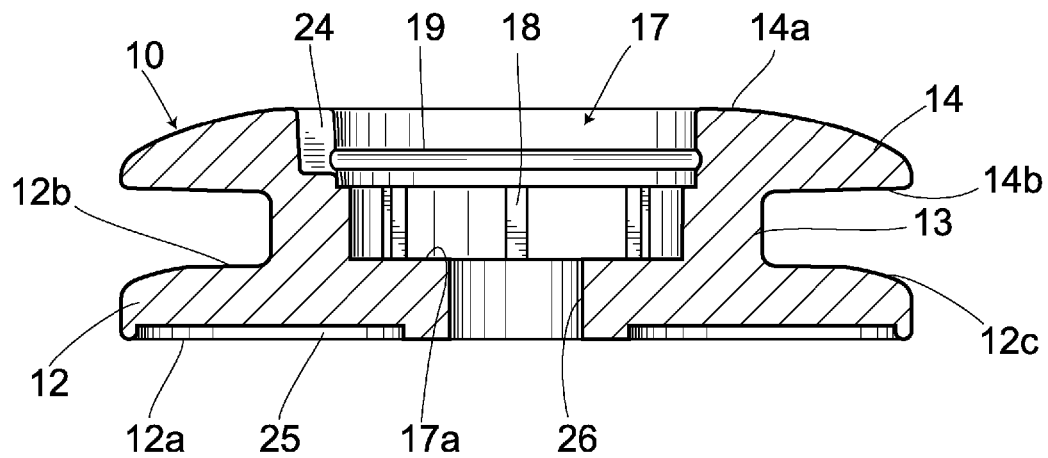

As shown in FIG. 6(A) and FIG. 6(B) representing a cross-sectional structure on A-A' position of FIG. 6(A), the depression 17 is equipped with a stepped portion 24 made by cutting off part of the inner circumferential surface. Therefore, when the cap 11 has been fitted into the depression 17, external force is applied from the stepped portion 24 to the cap 11 by using a tool (not shown) with a thin leading end such as a driver or the like and thus the protrusion 20 of the cap 11 is disengaged from the groove 19, thus permitting the cap 11 that has covered the depression 17 to be easily disengaged. In addition, the fixing surface 12a of the base portion 12 has an annular tape attaching portion 25 slightly depressed and when providing the adhesive tape 16 in the tape attaching portion 25, a protruding amount of the adhesive tape 16 can be restrained.

Further, at the bottom 17a of the depression 17, a through-hole 26 having a smaller diameter than that of the depression 17 is bored in the axis so as to penetrate vertically the base portion 12. As a result, the depression 17 and the through-hole 26 allow an external space at a side of an outer surface 14a of the holding portion 14 and an external space at a side of the fixing surface 12a of the base portion 12 to communicate with each other.

A fastening member (not shown) such as a screw, a bolt or the like is schemed so as to be capable of penetrating the through-hole 12 from the depression 17 of the holding portion 14 and then a wide head of the fastening member abuts against the bottom 17a of the depression 17 at the periphery of the through-hole 26 to be positioned there. Thus, in the support main body 10, the base portion 12 is fixed to an object for attachment by the fastening member and then the cap 11 is fitted into the depression 17, so that the cap 11 comes to cover over the fastening member.

Figure 7A:
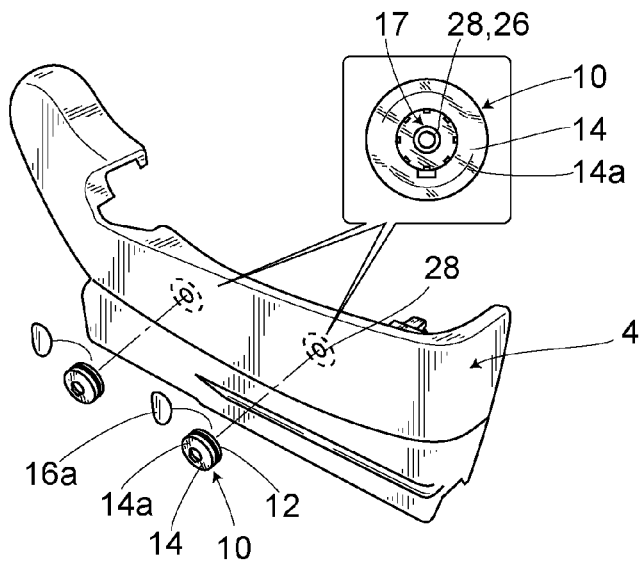
FIGS. 7(A) to 7(C) are schematic views illustrating how the in-vehicle holder support device is fixed to a right seat frame cover.

Next is a brief description of a method for mounting this in-vehicle holder support device 3 on a right seat frame cover 4. In this case, as shown in FIG. 7(A), a hole 28 is made by a drill not shown at a desired position of the right seat fame cover 4. Afterward, an exfoliating paper 16a of the adhesive tape 16 provided on the fixing surface 12a of the base portion 12 is exfoliated and then the support main body 10 is temporarily fixed with the hole 28 in conformity with the through-hole 26 of the support main body 10.

Figure 7B:
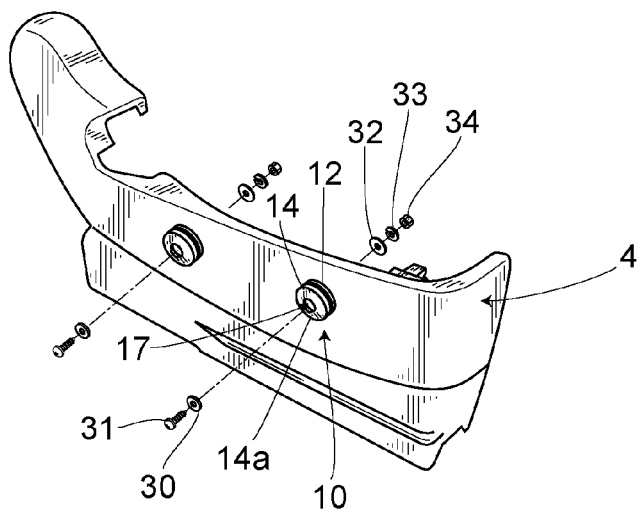

Then, as shown in FIG. 7(B), a screw 31 acting as the fastening member is inserted from the depression 17 at a side of the holding portion 14 into the through-hole 26 with a washer 30 interposed therebetween and then the washer 32 and a spring washer 33 are interposed between a leading end of the screw 31 which has been exposed on a rear side of the right seat frame cover 4 and the rear side to make a nut 34 engage with the screw. As a result, the support main body 10 is fixed to the right seat frame cover 4.

Figure 7C:
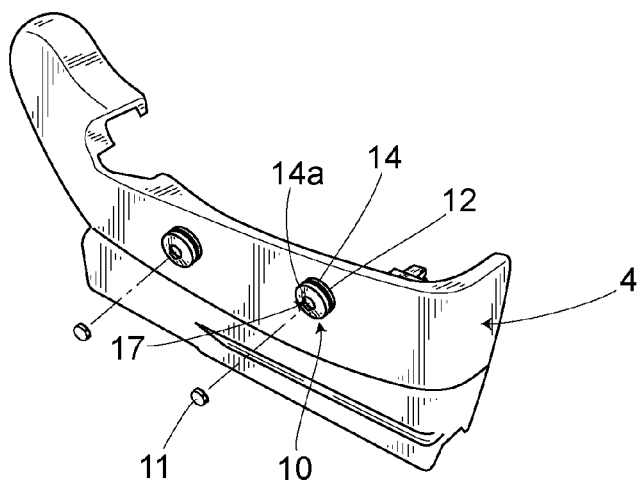

Finally, as shown in FIG. 7(C), by fitting the cap 11 into the depression 17 of the support main body 10, the wide head of the screw 31 is covered over with the cap 11 and then the support main body 10 can be fixed to the right seat frame cover 4 desired by a user while forming an integrated design between the support main body 10 and the right seat frame cover 4.

In the structure described above, in the in-vehicle holder support device 3, the top surface 14a of the holding portion 14 is allowed to smoothly slope toward a side of the right seat frame cover 4, that is an object for attachment, and is smoothened. Hence, when not using the in-vehicle holder support device 3 without the pocket not attached, even if fingers or the like of a user touch the holding portion 14, the fingers are allowed to smoothly slide, thus permitting unpleasant sensation given to a user to be substantially reduced.

Further, in the in-vehicle holder support device 3, there is provided the sloping surface 12c produced by making the opposed surface 12b of the base portion 12 slope smoothly toward the right seat frame cover 4 that is an object for attachment and the opposed surface 12b is smoothly finished by providing the sloping surface 12c to eliminate an angulated portion there. Besides, only an opening side of the gap G is opened widely with a side of the connecting portion 13 made narrower.

Accordingly, in the in-vehicle holder support device 3, the attaching portion 6 of the pocket 2 is allowed to slide on the sloping surface 12c and then is smoothly guided to the gap G between the base portion 12 and the holding portion 14 to be inserted into the gap G. Further, the fitting portion 8 of the attaching portion 6 can be easily fitted into a root of the gap G.

Figure 8:
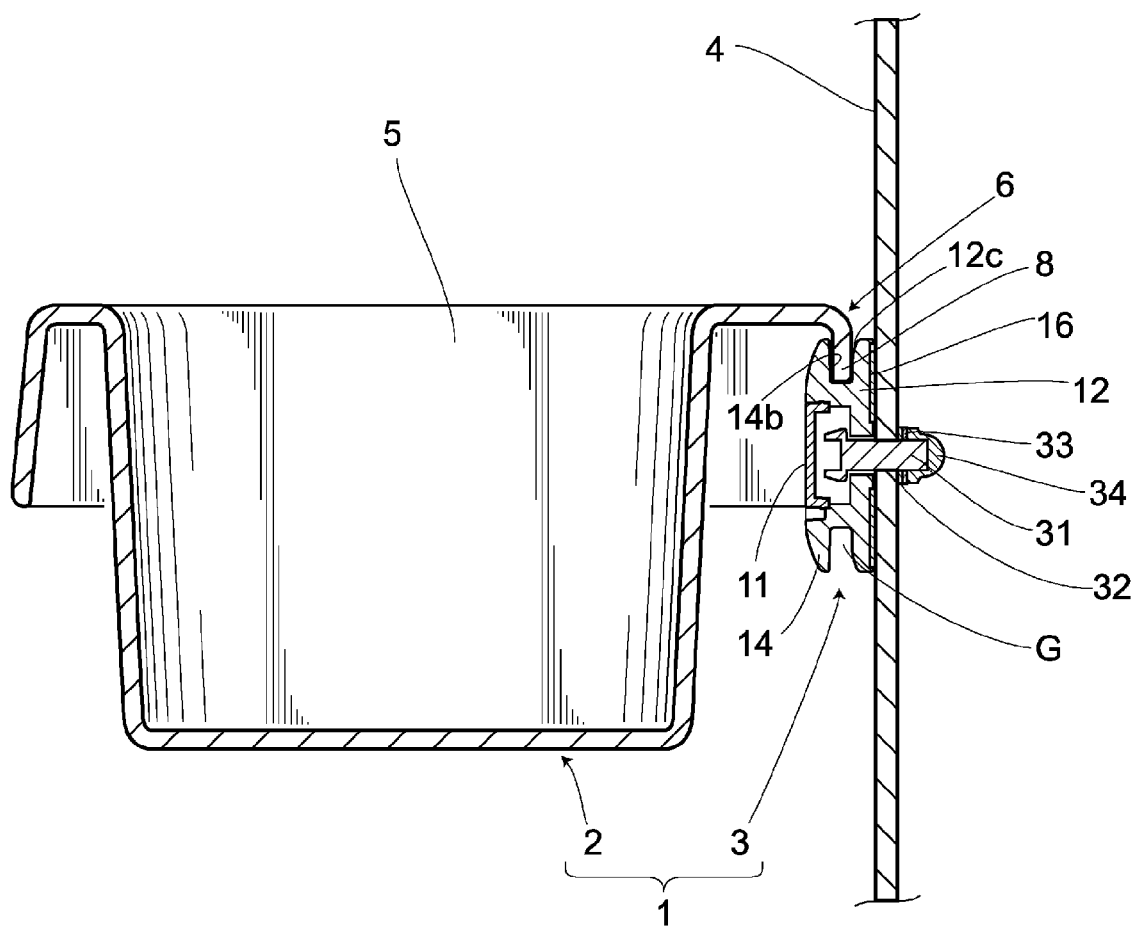
FIG. 8 is a cross-sectional view illustrating a condition where a pocket is supported by the in-vehicle holder support device.

In addition to this, in the in-vehicle holder support device 3, the opposed surface 14b of the holding portion 14 is formed flat and besides is arranged substantially perpendicularly to an axial direction a. Hence, the own weight of the pocket 2 applied from the fitting portion 8 can be certainly received by the holding portion 14, allowing the pocket 2 to be firmly supported with the housing portion 5 horizontally kept as shown in FIG. 8.

Further, in the in-vehicle holder support device 3, the whole of the inverted U-shaped region that builds up a periphery of the holding portion 14 can contact the fitting portion 8. Hence, a contact area between the holding portion 14 and the fitting portion 8 can be increased as much as possible, enabling the pocket 2 to be stably supported.

Furthermore, the in-vehicle holder support device 3 is fixed to an object for attachment by inserting the screw 31 into the through-hole 26. Hence, the support main body 10 can be easily and certainly fixed to a various portions as long as the portions would be formed substantially flat in conformity to the fixing surface 12a of the base portion 12.

Figure 9A:
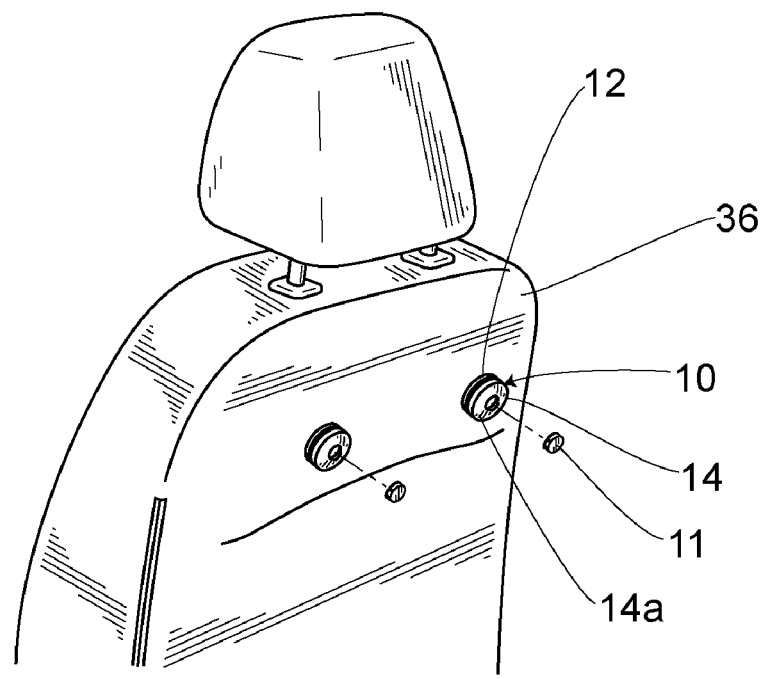
FIGS. 9(A) and 9(B) are schematic views illustrating how the in-vehicle holder support device is fixed to a seatback trim cover and a vehicle interior ceiling, respectively.
Figure 9B:
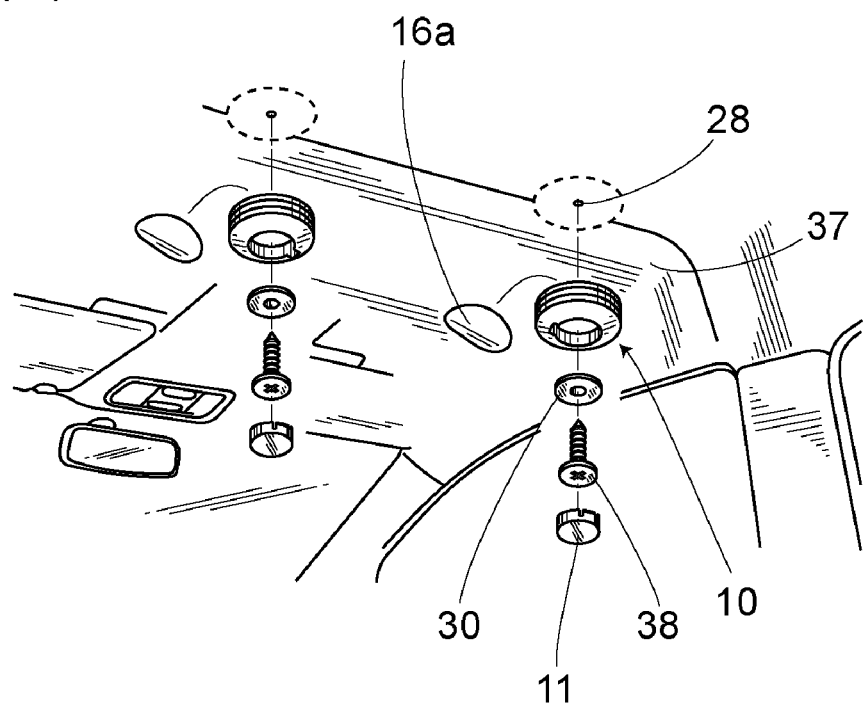

For example, as shown in FIG. 9(A), the in-vehicle holder support device 3 can be fixed also to a seatback trim cover 36 that is an object for attachment and further can be fixed also to a vehicle interior ceiling 37 as shown in FIG. 9(B). Incidentally, when the in-vehicle holder support device 3 is fixed to the vehicle interior ceiling 37, a tapping screw 38, e.g., may be used without using a bolt as a fixing member if the fixing strength can be ensured.

Figure 10A:
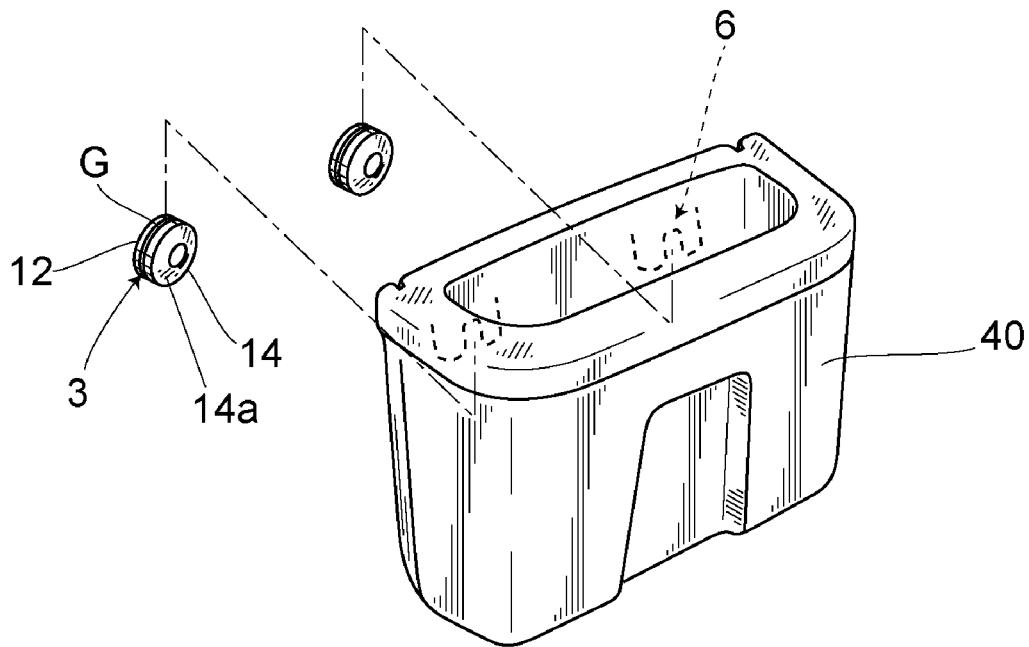
FIGS. 10(A) and 10(B) are schematic views illustrating structures of a trash box and table which are supported by the in-vehicle holder support device of the invention.
Figure 10B:
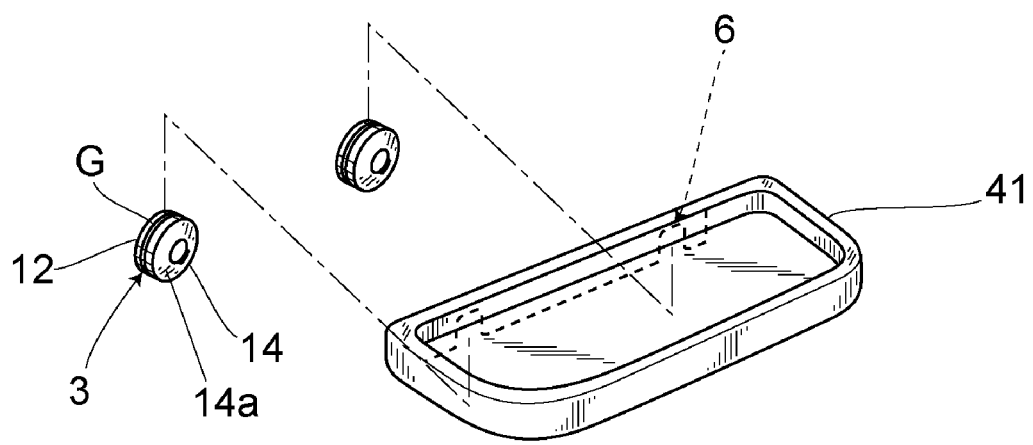

Moreover, the in-vehicle holder support device 3 can support a trash box 40 as shown in FIG. 10(A) and also a table 41 as shown in FIG. 10(B), that are in-vehicle holder units, if they are equipped with a fitting portion 6 which can be fitted into the gap G between the base portion 12 and the holding portion 14. Thus, according to a usage as required of a user, in-vehicle holder units can be altered on a case-by-case.

Figures 11, 11A:
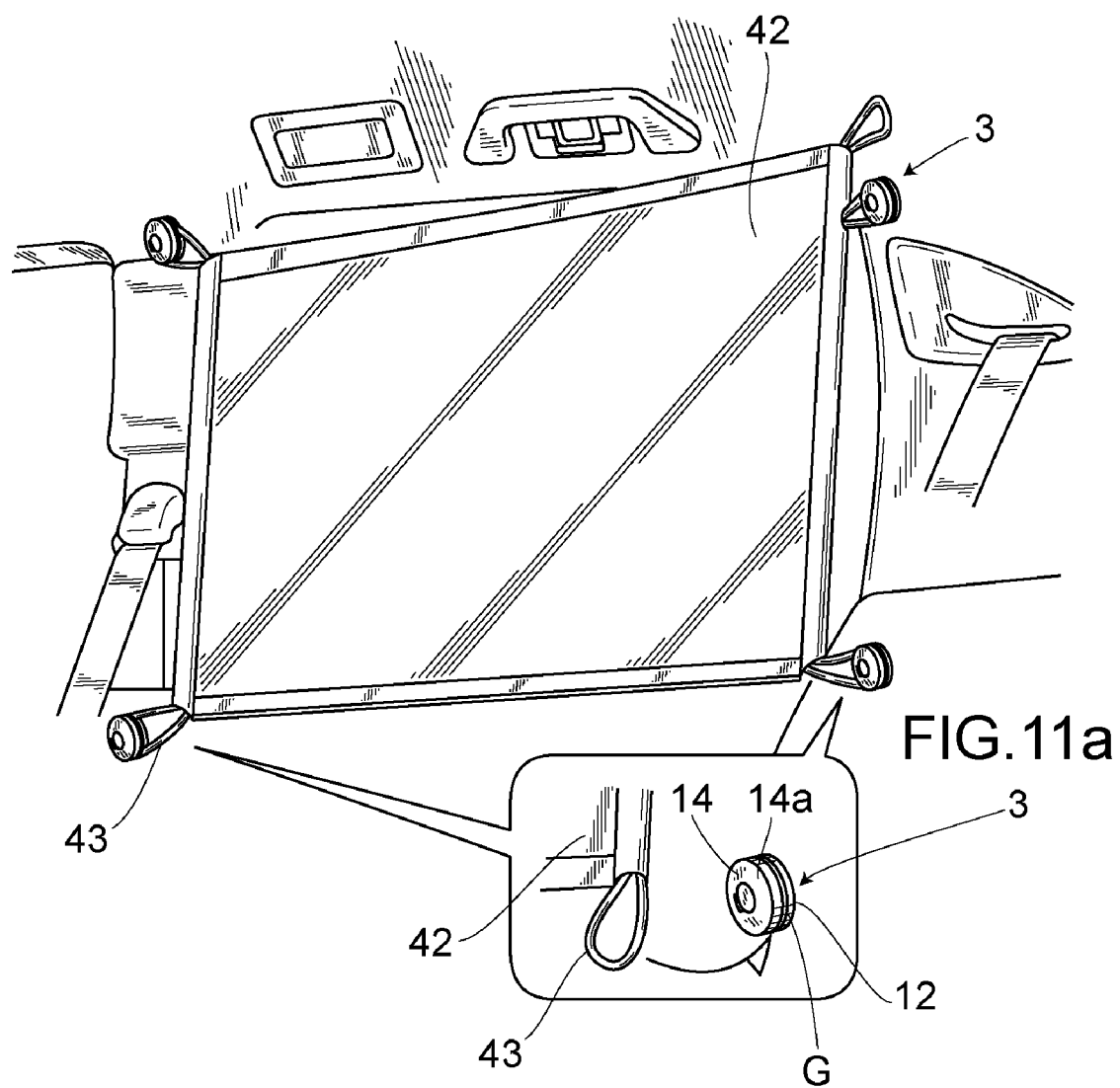
FIG. 11 is a schematic view illustrating a structure of a curtain supported by the in-vehicle holder support device of the invention.

For reference's sake, as shown in FIG. 11, by fixing the in-vehicle holder support device 3, e.g., to the vicinity of four corners of a lateral window at an in-vehicle rear side, a curtain 42 that is an in-vehicle holder unit can be also supported, thus enabling the lateral window to be covered with the curtain 42. Specifically, by engaging loops 43 provided at the four corners of the curtain 42 with the gap G between the base portion 12 and the holding portion 14, the curtain 42 can be supported to the in-vehicle holder support device 3.

According to the structure described above, across the sloping surface 12c of the base portion 12 which slopes toward the side of the right seat cover frame 4, the fitting portion 6 that is an object for attachment is allowed to slide and is easily guided to the gap G to be able to be inserted thereinto. Besides, the own weight of the pocket 2 can be certainly received by the opposed surface 14b of the holding portion 14 formed flat. Hence, the pocket 2 can be easily attached and besides its rigidity in the attached state can be improved.

(Second Embodiment)

Figure 12A:
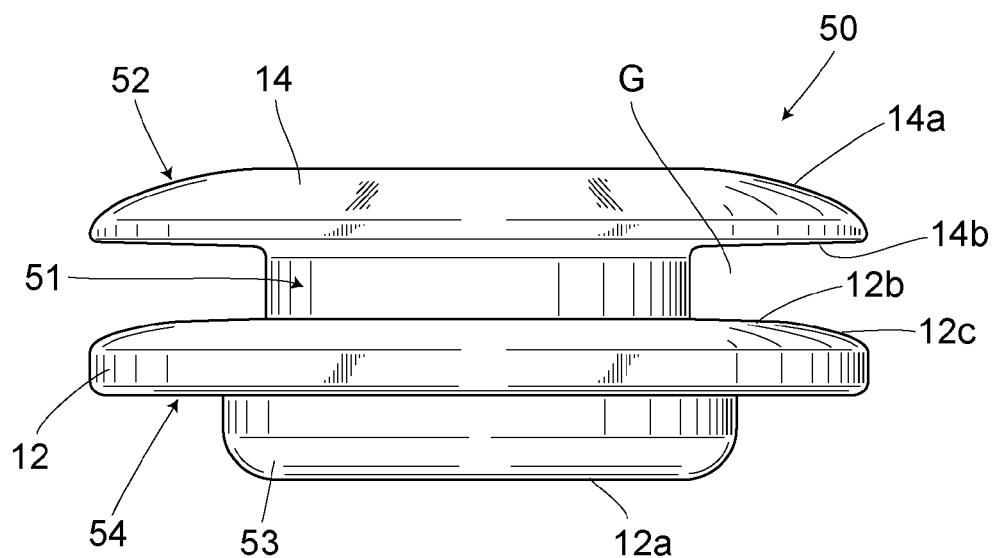
FIGS. 12(A) and 12(B) are side views illustrating a side structure of an in-vehicle holder support device according to a second embodiment of the invention.
Figure 12B:
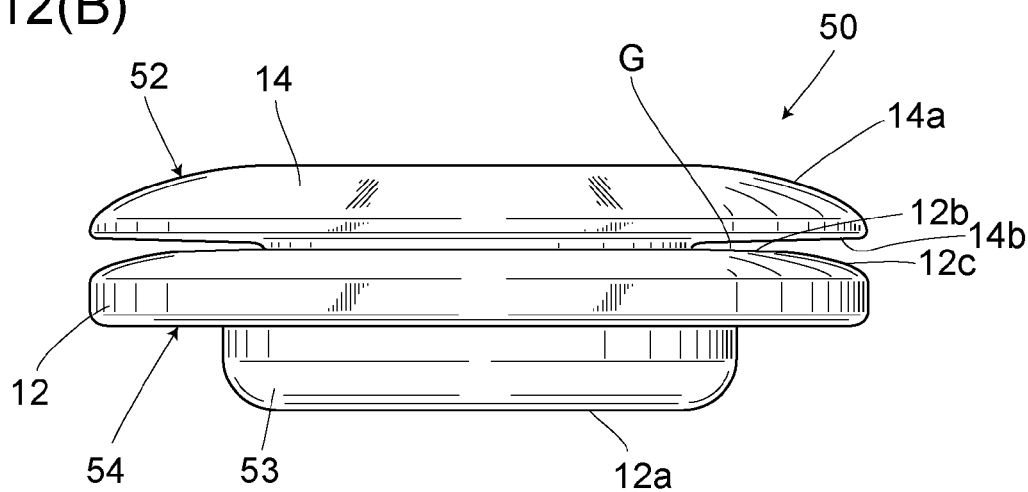

In FIG. 12(A) and FIG. 12(B), numeral symbol 50 denotes an in-vehicle holder support device according to a second embodiment, which differs from the first embodiment in terms of a structure of the gap G between the base portion 12 and the holding portion 14, which can be regulated telescopically in this embodiment. For the simplicity, hereinafter will be described only the different parts with numeral symbols thereof changed.

Figure 13A:
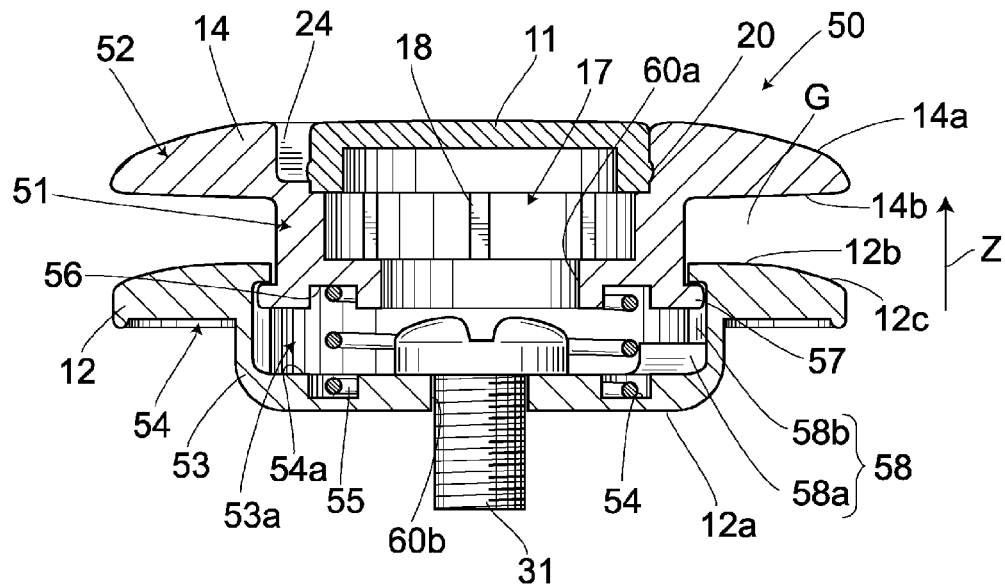
FIGS. 13(A) and 13(B) are cross-sectional views illustrating a transverse cross-sectional structure of the in-vehicle holder support device according to the second embodiment.

In practice, as shown in FIG. 13(A), the in-vehicle holder support device 50 comprises a movable body 52 made up by integrating a connecting portion 51 and the holding portion 14 with each other and a stationary body 54 made up by integrating a receiving portion 53 into which the connecting portion 51 can be received and the base portion 12 with each other.

The receiving portion 53 is formed in a bottomed cylindrical shape substantially the same as a shape of the connecting portion 51 and a housing depressed portion 53a inside the receiving portion 53 is formed slightly larger than the connecting portion 51. Accordingly, the receiving portion 53 can house the connecting portion 51 in the housing depressed portion 53a.

On an upper surface 54a of the bottom of the receiving portion 53, a through-hole 60b is made into which the screw 31 can be inserted. Then, an annular groove 54 is formed so as to environ the through-hole 60b and one end of a compression spring 55 is positioned in the groove 54. The other end of the compression spring 55 is positioned in an annular groove 56 formed on the bottom of the connecting portion 51. Thus, the compression spring 55 can energize the movable body 52 in an upward direction indicated by an arrow z.

The connecting portion 51 is equipped with a plurality of guide protrusions 57 in its peripheral surface. Then, the guide protrusions 57 are fitted into a guide groove 58 on an inner circumferential surface of the receiving portion 53. The guide protrusions 57 impinges on one end of the guide groove 58 by energizing force of the compression spring 55 and thus can be prevented from disengaging from the receiving portion 53.

Figure 14:
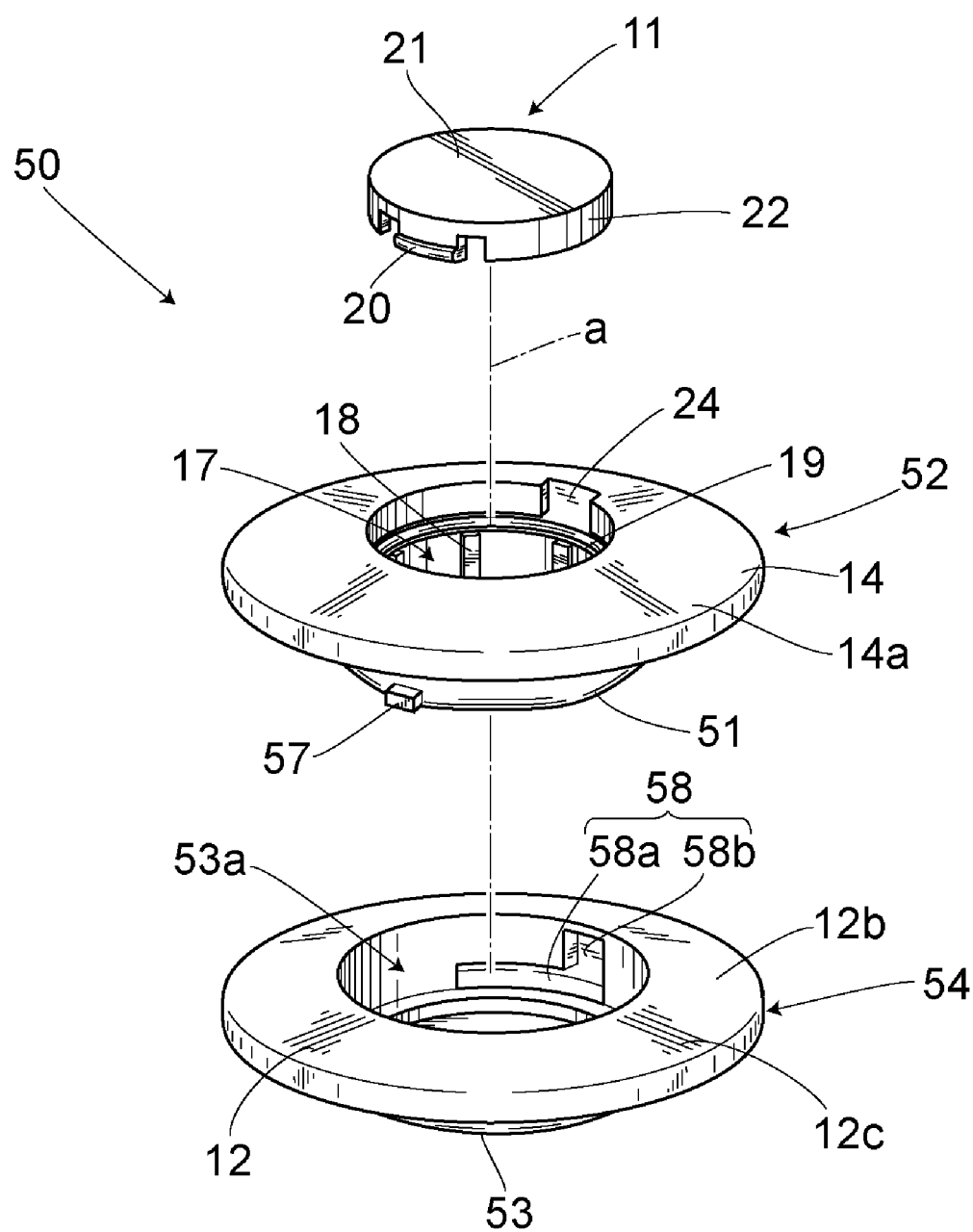
FIG. 14 is an exploded view of the in-vehicle holder support device according to the second embodiment that is disassembled into a movable body and a fixed body.

Here, as shown in FIG. 14, in an inner circumferential surface of the housing depressed portion 53a of the receiving portion 53, the guide groove 58 comprises a lateral groove 58a circumferentially extending and a longitudinal groove 58b which is provided in one end of the lateral groove 58a and extends in an axial direction a. Accordingly, the guide protrusions 57 is positioned in one end of the longitudinal groove 58b by means of the compression spring 55 and thus as shown in FIG. 13(A), the connecting portion 51 is exposed from the receiving portion 53 to the outside, thereby permitting the gap G between the holding portion 14 and the base portion 12 to be formed.

Further, in the connecting portion 51, the holding portion 14 is pressed against the compression spring force, so that the guide protrusions 57 moves to the other end of longitudinal groove 58b to be housed in the receiving portion 53. As a result, the gap G between the holding portion 14 and the base portion 12 can be decreased (refer to FIG. 12(B)).

In the meantime, in the present embodiment, when the connecting portion 51 is allowed to subside or be received into the receiving portion 53, the gap G between the holding portion 14 and the base portion 12 is decreased. The present invention, however, is not limited to such case and it may be schemed that when the connecting portion 51 is allowed to subside into the receiving portion 53, the gap G between the holding portion 14 and the base portion 12 may be closed.

Figure 13B:
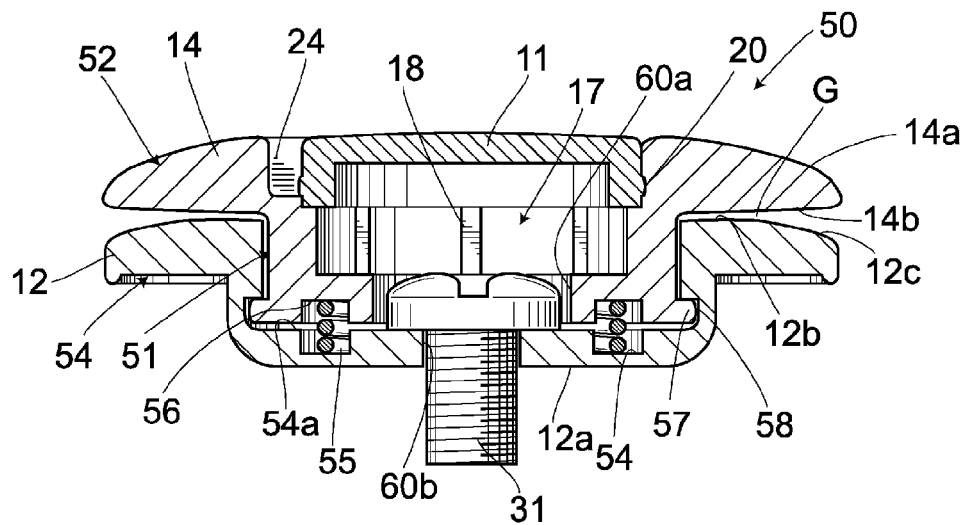

Furthermore, in the connecting portion 51, the movable body 52 is rotated with the state kept and thus as shown in FIG. 13(B) the guide protrusions 57 moves to the lateral groove 58a. Then, with the connecting portion 51 kept housed in the receiving portion 53, the gap G between the holding portion 14 and the base portion 12 can be kept reduced.

A through-hole 60a with a large diameter into which a wide head of the screw 31 can be inserted is made on the bottom of the depression 17 of the connecting portion 51 and the screw 31 can pass through the through-hole 60a to be arranged in the receiving portion 53. On the bottom of the receiving portion 53, the screw 31 is allowed to pass through a through-hole 60b with a small diameter and then the wide head of the screw 31 can be stopped on the bottom of the receiving portion 53.

In the structure described above, the in-vehicle holder support device 50 can achieve the same effects as those achieved by the first embodiment. Besides, the connecting portion 51 can be housed in the receiving portion 53. Hence, the gap G between the holding portion 14 and the base portion 12 can be reduced, thus permitting the in-vehicle holder support device 50 to be further low-profiled in no used state.

Further, in the in-vehicle holder support device 50, there is provided the compression spring 55 between the connecting portion 51 and the receiving portion 53 and then the energizing force is consistently applied so as to separate the holding portion 14 from the base portion 12. Hence, when the connecting portion 51 has subsided into the receiving portion 53, only by turning the holding portion 14 along the guide groove 58 to guide the holding portion 14 to the longitudinal groove 58b, the connecting portion 51 can be exposed outside from the receiving portion 53 by means of energizing force of the compression spring 55, thus permitting the gap G between the holding portion 14 and the base portion 12 to be easily formed.

Figure 15A:
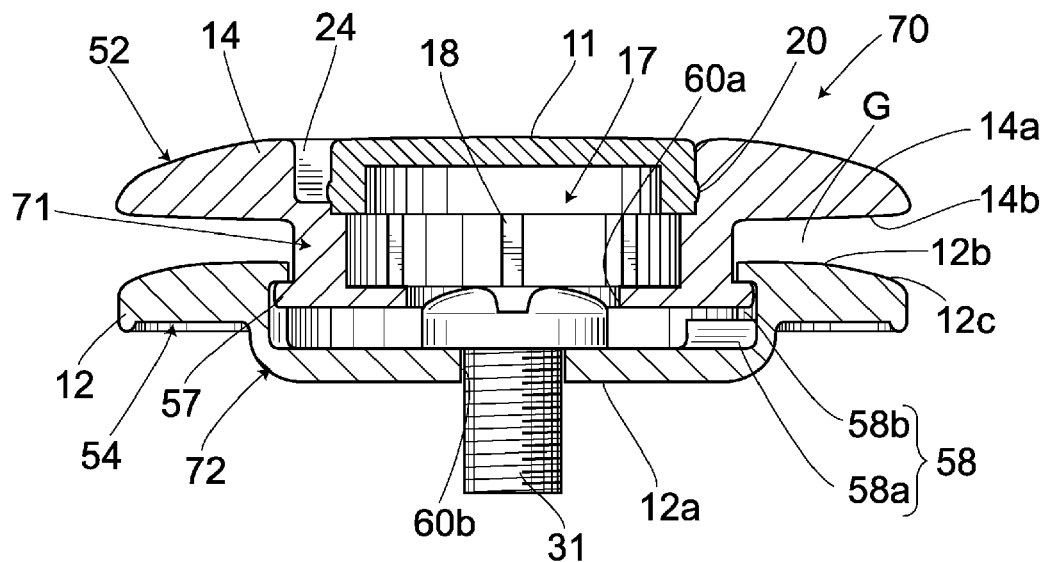
FIGS. 15(A) and 15(B) are cross-sectional views illustrating a transverse cross-sectional structure of an in-vehicle holder support device according to another embodiment.
Figure 15B:
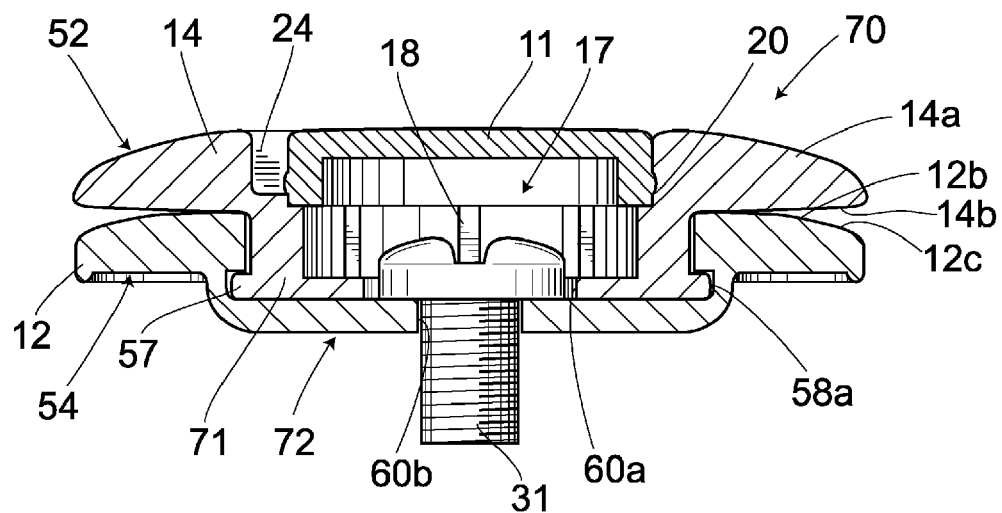

In addition, in the embodiment described above, the in-vehicle holder support device 50 has been described in which the compression spring 55 was provided between the connecting portion 51 and the receiving portion 53. The present invention, however, is not limited to this structure and as shown in FIG. 15(A) and FIG. 15(B) in which the same numeral symbols have been labeled for portions corresponding to those shown in FIG. 13(A) and FIG. 13(B), with the compression spring 55 omitted between the connecting portion 71 and the receiving portion 72, an in-vehicle holder support device 70 may be schemed in which the connecting portion 71 can subside into the receiving portion 72. In this case, the in-vehicle holder support device 70 can be low-profiled further by the thickness corresponding to that of the compression spring omitted.

Further, in the embodiment described above, the base portion 12 is provided with the receiving portion 53 to allow the connecting portion 51 of the holding portion 14 to subside or be received into the receiving portion 53. The present invention, however, is not limited to this scheme and so the holding portion 14 may be provided with a receiving portion and besides the base portion 12 may be provided with the connecting portion.

(Third Embodiment)

Figure 16:
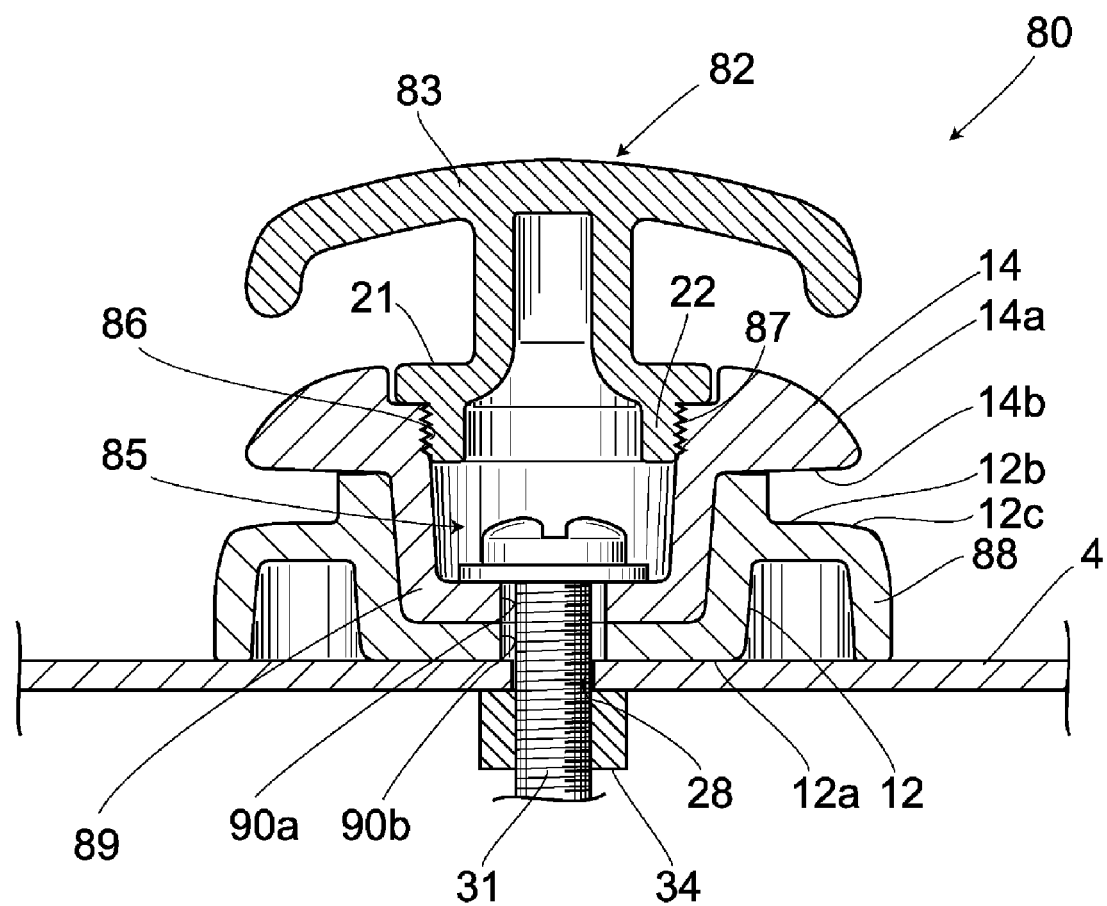
FIG. 16 is a cross-sectional view illustrating a transverse cross-sectional structure of an in-vehicle holder support device according to a third embodiment.

In FIG. 16, numeral symbol 80 denotes an in-vehicle holder support device according to a third embodiment. The different point of the third embodiment from the first and second embodiments is that a cap 82 can be detachably screwed into a depression 85 of the holding portion 14.

Figure 17A:
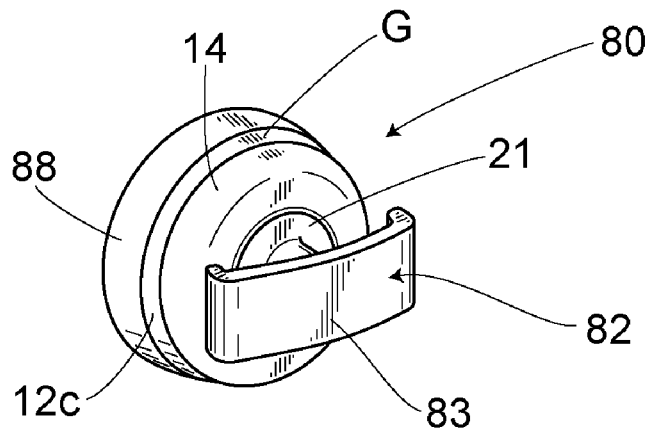
FIGS. 17(A) to 17(C) are schematic views illustrating various types of caps detachably provided in a holding portion.

In the case of the present embodiment, the cap 82 having, in its top 21, a suspension unit 83 substantially T-shaped in lateral view is screwed into the holding portion 14 as shown in FIG. 17(A) and thus a bag, e.g., not shown can be hung on the suspension portion 83.

In practice, as shown in FIG. 16, the holding portion 14 is formed with an internal thread 86 in an inner circumferential surface of the depression 85. An external thread formed in a wall 22 of the cap 82 is screwed into the internal thread 86, so that the cap 82 is freely detachably provided.

For reference's sake, in the present embodiment, the base portion 12 is provided with a leg 88, by which the base portion 12 is selected to have a given thickness. Then, a connecting portion 89 formed integrally with the holding portion 14 can be fitted into an inside of the base portion 12. Accordingly, the connecting portion 89 and the base portion 12 can be fixed to the right seat frame cover 4 by inserting the screw 31 inserted into through-holes 90a, 90b into a hole 28 of the right seat frame cover 4 to screw a leading end of the screw 31 exposed from the rear side of the right seat frame cover 4 into a nut 34.

In the structure described above, in the in-vehicle holder support device 80, the cap 82 is detachably provided in the depression 85 of the holding portion 14. Hence, according to a usage as required of a user, the cap 82 can be replaced by different types thereof.

Further, in the in-vehicle holder support device 80, the cap 82, acting as a detachable member, is allowed to be screwed into the depression 85 of the holding portion 14. Hence, the cap 82 can be detachably provided in the holding portion 14 and besides can be attached firmly to the holding portion 14.

Figure 17B:
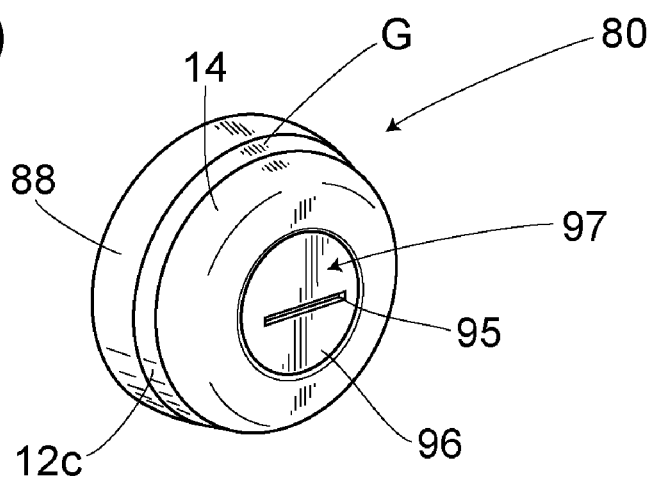

Thus, in the in-vehicle holder support device 80, when there is no need to hang a bag or the like, as shown in FIG. 17(B), a cap 97a formed with a groove which can be turned by a driver and with the top 96 having a substantially non-protruding surface can be attached to the holding portion 14.

Figure 17C:
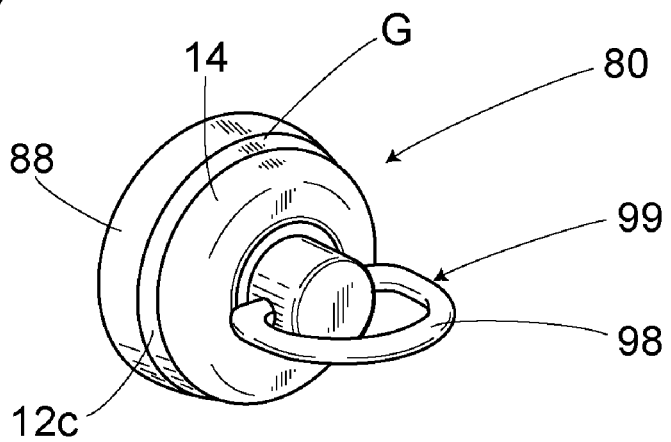

Further, in the in-vehicle holder support device 80, according to a usage as required of a user, a cap 99 equipped with a ring-shaped suspension portion 98 can be also attached to the holding portion 14 as shown in FIG. 17(C).

According to the structure described above, the cap 82, 97 or 98 is exchangeable according to a usage as required of a user, and besides the cap 82, 97 or 98 can be firmly attached to the holding portion 14 by screwing the cap into the holding portion 14.

In the meantime, the present invention is not limited to the first to third embodiments and the various modifications are possible within the scope of the gist of the present invention. The first to third embodiments, e.g., may be accordingly combined to create new structures.

What is claimed:

1. An in-vehicle holder support device for freely and detachably supporting an in-vehicle holder unit at an arbitrary attaching position in a vehicle interior portion, comprising:
   a substantially circular base portion arranged in said attaching position; and
   a holding portion arranged coaxially with said base portion at a given distance from said base portion via a connecting portion of a smaller diameter than that of said base portion, said holding portion having substantially the same circular shape and substantially the same size as said base portion,
   wherein in a peripheral edge of an opposed surface to said holding portion, said base portion is formed with a sloping surface which slopes toward said vehicle interior portion for attaching the in-vehicle holder unit thereto while an opposed surface of said holding portion to said base portion is formed flat, and besides said opposed surface of said holding portion is arranged substantially perpendicularly to an axial direction of said connecting portion,
   wherein a width of a gap between said base portion and said holding portion is wider at an outer edge of said base portion and said holding portion compared to a gap between said base portion and said holding portion located at said connecting portion so as to fit an attaching portion of said in-vehicle holder unit into said gap by only inserting the attaching portion into said gap,
   wherein an external surface of the holding portion is formed with a columnar depression coaxially with the holding portion, a through-hole is bored at the bottom of the depression so as to vertically penetrate the base portion, the base portion is fixed to the attaching position by a fastening member penetrating the through-hole from the depression of the holding portion, and then a cap is fitted into the depression, so that the cap comes to cover over the fastening member,
   wherein an exterior side of said base portion, opposite to an interior side of said base portion facing the holding portion, is configured to press against the vehicle interior portion.

2. The in-vehicle holder support device according to claim 1, wherein said base portion has a diameter equal to said holding portion.

3. The in-vehicle holder support device according to claim 1, wherein said in-vehicle holder unit is freely detachable from said in-vehicle holder support device.

4. The in-vehicle holder support device according to claim 3, wherein said in-vehicle holder unit is detached by moving said support device upwards.

5. The in-vehicle holder support device according to claim 1, wherein a nut is used to fasten said in-vehicle holder support device to said vehicle interior.

6. The in-vehicle holder support device according to claim 1, wherein said in-vehicle holder unit is held in between the gap of the base portion and the holding portion.

7. An in-vehicle holder support device for freely and detachably supporting an in-vehicle holder unit at an arbitrary attaching position in a vehicle interior portion, comprising:
   a circular base portion arranged in said attaching position; and
   a holding portion arranged coaxially with said base portion at a given distance from said base, said holding portion having the same circular shape and size as said base portion,
   a circular connecting portion which has a smaller diameter than that of said base portion and said holding portion,
   wherein said connecting portion connects said holding portion and said base portion,
   wherein in a peripheral edge of an opposed surface to said holding portion, said base portion is formed with a sloping surface which slopes toward said vehicle interior portion for attaching the in-vehicle holder unit thereto while an opposed surface of said holding portion to said base portion is formed flat, and besides the opposed surface of said holding portion is arranged substantially perpendicularly to an axial direction of said connecting portion,
   wherein a width of a gap between said base portion and said holding portion is wider at an outer edge of said base portion and said holding portion compared to a gap between said base portion and said holding portion located at said connecting portion so as to fit an attaching portion of said in-vehicle holder unit into said gap by only inserting the attaching portion into said gap,
   wherein an external surface of the holding portion is formed with a columnar depression coaxially with the holding portion, a through-hole is located at the bottom of the depression so as to vertically penetrate the base portion, the base portion being fixed to the attaching position by a fastening member penetrating the through-hole from the depression of the holding portion, and a cap being fitted into the columnar depression, so that the cap comes to cover over the fastening member,
   wherein an exterior side of said base portion, opposite to an interior side of said base portion facing the holding portion, is configured to press against the vehicle interior portion.

8. The in-vehicle holder support device according to claim 7, wherein said through-hole has a smaller diameter than said columnar depression.

9. The in-vehicle holder support device according to claim 7, wherein said in-vehicle holder unit is freely detachable from said in-vehicle holder support device.

10. The in-vehicle holder support device according to claim 9, wherein said in-vehicle holder unit is detached by moving said support device upwards.

11. The in-vehicle holder support device according to claim 7, wherein a nut is used to fasten said in-vehicle holder support device to said vehicle interior.

12. The in-vehicle holder support device according to claim 7, wherein said in-vehicle holder unit is held in between the gap of the base portion and the holding portion.

* * * * *